US008747539B2

(12) United States Patent
Verville et al.

(10) Patent No.: US 8,747,539 B2
(45) Date of Patent: Jun. 10, 2014

(54) CHITOSAN-BASED ADHESIVES AND USES THEREOF

(75) Inventors: Andre Verville, Laval (CA); Yves Charest, Ancienne-Lorette (CA); Martin Beaulieu, Sainte-Foy (CA); Stephane Chabot, Levis (CA); Richard Lepine, Quebec (CA)

(73) Assignees: Uniboard Canada Inc., Laval (CA); EXP Services Inc., Brampton (CA)

( * ) Notice: Subject to any disclaimer, the term of this patent is extended or adjusted under 35 U.S.C. 154(b) by 106 days.

(21) Appl. No.: 13/463,280

(22) Filed: May 3, 2012

(65) Prior Publication Data

US 2012/0217680 A1    Aug. 30, 2012

Related U.S. Application Data

(62) Division of application No. 12/707,667, filed on Feb. 17, 2010.

(60) Provisional application No. 61/154,034, filed on Feb. 20, 2009.

(51) Int. Cl.
  *C08L 5/08*   (2006.01)
  *C08L 97/02*  (2006.01)
  *C09J 105/08* (2006.01)

(52) U.S. Cl.
  CPC . *C08L 97/02* (2013.01); *C08L 5/08* (2013.01); *C08L 2666/26* (2013.01); *C09J 105/08* (2013.01)
  USPC .................................................. 106/162.2

(58) Field of Classification Search
  CPC .......... C09J 105/08; C08L 5/08; C08L 97/02; C08L 2666/26
  USPC ..................................................... 106/162.2
  See application file for complete search history.

(56) References Cited

U.S. PATENT DOCUMENTS

| 2,047,226 | A |   | 7/1936 | Rigby |
|---|---|---|---|---|
| 5,939,192 | A |   | 8/1999 | Rettenbacher |
| 5,961,782 | A | * | 10/1999 | Luu et al. ............... 162/111 |
| 6,329,337 | B1 |   | 12/2001 | Morita |
| 6,740,373 | B1 |   | 5/2004 | Swoboda |
| 6,818,317 | B2 |   | 11/2004 | Hejna |
| 2002/0028857 | A1 |   | 3/2002 | Holy |
| 2005/0281883 | A1 |   | 12/2005 | Daniloff |
| 2010/0291306 | A1 |   | 11/2010 | Tsuchida |
| 2010/0316715 | A1 |   | 12/2010 | Andersson |

FOREIGN PATENT DOCUMENTS

| CA | 1 241 900 A | | 9/1988 |
|---|---|---|---|
| EP | 1 787 807 A1 | | 5/2005 |
| EP | 1 818 172 A1 | | 8/2007 |
| JP | 06/247815 A | | 9/1994 |
| JP | 09/176838 A | | 7/1997 |
| JP | 2001/329433 A | | 11/2001 |
| JP | 2003286462 A | | 10/2003 |
| JP | 2005/081815 A | | 3/2005 |
| WO | 97/19141 A1 | | 5/1997 |
| WO | WO 97/19141 | * | 5/1997 |
| WO | 2006/118895 A2 | | 11/2006 |
| WO | 2007/086211 A1 | | 8/2007 |
| WO | 2009/056602 A1 | | 5/2009 |

OTHER PUBLICATIONS

Unemura, "Develpoment of new natural polymer-based wood adhesives I", J Wood Sci (2003) 49:221-226.*
Path, "Plywood, OSB & MDF" (Oct. 2007).*
Il'Ina, A.V., and V.P. Varlamov, "Hydrolysis of Chitosan in Lactic Acid," Applied Biochemistry and Microbiology 40(3):300-303, May 2004.
Peshkova S., and L. Kaichang, "Investigation of Chitosan-Phenolics Systems As Wood Adhesives," Journal of Biotechnology 102(2):199-207, Apr. 2003.
Umemura, K., et al., "Development of New Natural Polymer-Based Wood Adhesives I: Dry Bond Strength and Water Resistance of Konjac Glucomannan, Chitosan, and Their Composites," Journal of Wood Science 49(3):221-226, Jun. 2003.

* cited by examiner

*Primary Examiner* — David M Brunsman
(74) *Attorney, Agent, or Firm* — Christensen O'Connor Johnson Kindness PLLC

(57) ABSTRACT

There is provided an adhesive comprising chitosan an optionally a crosslinking agent. A method for preparing such an adhesive is also disclosed. A wood-panel made with such an adhesive is also provided. Moreover, a method for manufacturing a wood-based panel is provided. The method comprises preparing a mixture comprising wood, chitosan, optionally a crosslinking agent, and optionally an acid, forming a mat with the mixture, and pressing the mat under heat and pressure so as to obtain the wood-based panel.

20 Claims, 3 Drawing Sheets

CHITOSAN-BASED ADHESIVES AND USES THEREOF

CROSS-REFERENCE TO RELATED APPLICATIONS

The present application is a divisional application of U.S. patent application Ser. No. 12/707,667 filed Feb. 17, 2010, which claims the benefit of U.S. Provisional Application No. 61/154,034 filed Feb. 20, 2009, which are hereby incorporated by reference in their entirety.

FIELD OF THE DISCLOSURE

The present disclosure relates to the field of adhesives. More specifically, the disclosure relates to chitosan-based adhesives as well as to methods for using such adhesives and methods for preparing such adhesives. The disclosure further relates to items prepared with such adhesives. Examples of items include in a non-limitative manner various wood-based panels such as oriented strandboards (OSB), low density fibreboards (LDF), medium density fiberboards (MDF), high density fiberboards (HDF), particle boards, hardboards, plywood, etc.

BACKGROUND OF THE DISCLOSURE

For several years now, the population and the companies have become increasingly sensitized to the effect that certain chemical compounds used domestically or industrially may have on the environment. This new awareness promotes the emergence of so-called green or environmentally friendly products. These chemical compounds with known incidence on the environment include formaldehyde. This product is used widely throughout the world; it enters into the formulation of urea-formaldehyde and phenol-formaldehyde resins, among other products. These adhesives have multiple applications in the manufacture of various items such as wood panels. In the manufacture of these panels, and for some time after, formaldehyde is released into the atmosphere and the ambient air.

Developments are in progress to produce new adhesives, for the purpose of decreasing the formaldehyde emanations. Today, some of these new adhesives are based on plant proteins. However, the use of a material that can be used directly for human nutrition is controversial, as demonstrated in the debate about the production of ethanol based on corn or sugar beet. Since there is always a demand for a substitute, it would desirable to be provided with a novel product that would overcome at least one of the prior art drawbacks.

SUMMARY OF THE DISCLOSURE

In accordance with one aspect there is provided an adhesive comprising chitosan and a crosslinking agent chosen from glyoxal, glyoxal derivatives, benzoquinone, benzoquinone derivatives, and mixtures thereof.

In accordance with another aspect there is provided a wood-based panel comprising wood and an adhesive comprising chitosan and a crosslinking agent chosen from glyoxal, glyoxal derivatives, benzoquinone, benzoquinone derivatives, and mixtures thereof, and wherein the adhesive is at least partially cured.

In accordance with another aspect there is provided a method for manufacturing a wood-based panel. The method comprises preparing a mixture comprising wood, chitosan, an acid, and optionally a crosslinking agent, forming a mat with the mixture, and pressing the mat under heat and pressure so as to obtain the wood-based panel.

In accordance with another aspect there is provided a wood-based panel obtained by using the adhesive as previously defined or by the method as previously defined.

In accordance with another aspect, there is provided a kit for preparing an adhesive, the kit comprises:
chitosan;
a crosslinking agent chosen from glyoxal, glyoxal derivatives, benzoquinone, benzoquinone derivatives, and mixtures thereof; and
optionally instructions indicating how mixing together the chitosan and the crosslinking agent in order to prepare the adhesive.

In accordance with another aspect, there is provided a method for preparing an adhesive, the method comprising mixing together wood, chitosan, an acid, and optionally a crosslinking agent.

It has been found that such adhesives can replace resins such as formaldehyde-containing resins. In fact, it was found that such adhesives are environmental friendly adhesives that can be prepared at low cost and easily but that also permit to obtain results that are at least equal or similar to results obtained with formaldehyde-containing resins. For example, such adhesives can be used in order to prepare panels that would meet the standards of ANSI A208.2-2002 (approved May 13, 2002) and/or ANSI A208.2-2009 (approved Feb. 2, 2009), which are hereby incorporated by reference in their entirety. Several examples have been made in which the properties of the wood-based panels prepared with such adhesives have properties, which are superior to the properties of test panels made with a formaldehyde-containing resin and certain properties superior to the required standards mentioned below (even for the highest quality grades). It was also found that such adhesives can be prepared in advance and used when required or it can be generated in situ and used when preparing an item.

BRIEF DESCRIPTION OF DRAWINGS

In the appended drawings which represent various examples.

DETAILED DESCRIPTION OF THE DISCLOSURE

Figure 1:
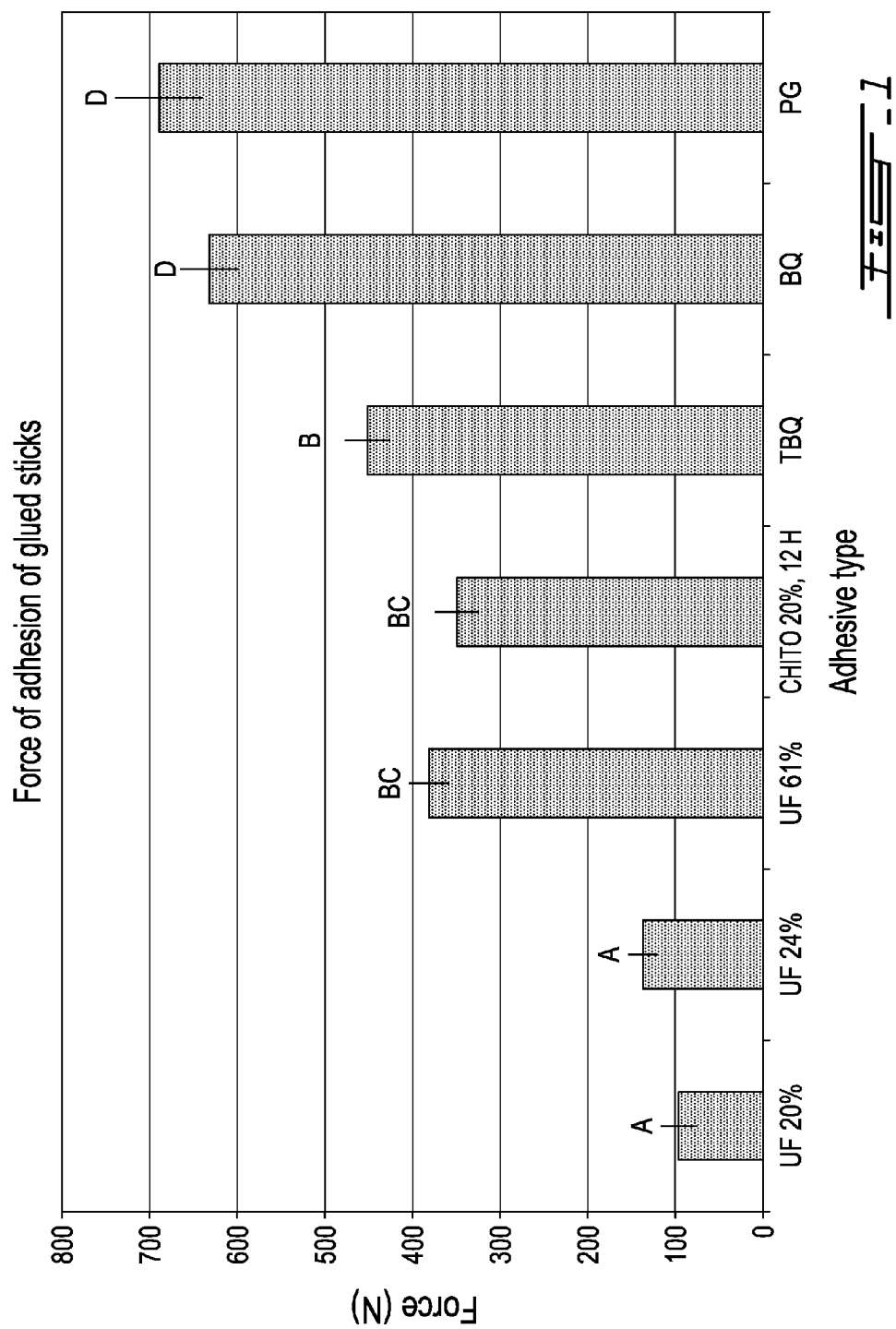
FIG. 1 is a column graph showing the force of adhesion of sticks glued with examples of adhesives as discussed in the present document in comparison with sticks glued with a control adhesive comprising an urea-formaldehyde resin.

The following embodiments represent non-limitative examples.

The expression "glyoxal derivatives" refers, for example, to compounds that belong to the family of glyoxal. Such compounds usually have the same backbone than glyoxal but they can also comprise various substituents. Such an expression also encompasses compounds that can be obtained by modifying glyoxal or glyoxal derivatives and that are suitable for use as a crosslinking agent.

The expression "benzoquinone derivatives" refers, for example, to compounds that belong to the family of benzoquinones. Such compounds usually have the same backbone than benzoquinone but they can also comprise various substituents. Such an expression also encompasses compounds that can be obtained by modifying benzoquinone or benzoquinone derivatives and that are suitable for use as a crosslinking agent.

The term "about as used herein" refers, for example, to a reasonable amount of deviation of the modified term such that the end result is not significantly changed. These terms of degree should be construed as including a deviation, for example, of at least ±5% of the modified term if this deviation would not negate the meaning of the word it modifies.

For example, the crosslinking agent can be chosen from methylglyoxal, phenylglyoxal, hexylglyoxal, benzoquinone, t-butylbenzoquinone, and mixtures thereof. The crosslinking agent can be present in the adhesives at a molecular ratio crosslinking agent:chitosan of at least about 1:40, at least about 1:30, at least about 1:20, about 1:40 to about 1:10, or about 1:30 to about 1:15. For example, the crosslinking agent can be a water-soluble crosslinking agent.

For example, the chitosan can be hydrolyzed chitosan such as acid hydrolyzed chitosan or enzymatically hydrolyzed chitosan. The chitosan can be water-soluble chitosan. For example, the chitosan can be in a dry powder form before being mixed with components. The chitosan used can be in a substantially dry powder form such as an atomized chitosan powder. The chitosan can have a molecular weight below 10 000 Daltons. Chitosan and the crosslinking agent can be in admixture with an acid and the chitosan has a concentration of about 10 to about 30% m/v or about 15 to about 25% m/v. For example, the concentration can be about 20% m/v.

The adhesives can have a curing time of about 30 seconds to about 600 seconds at a temperature of of about 20° C. to about 80° C. Alternatively, the adhesive can have a curing time of about 30 seconds to about 120 seconds at a temperature of about 60° C. to about 120° C.

The adhesives can have a gelling time of about 30 seconds to about 300 seconds, about 30 seconds to about 180 seconds, about 30 seconds to about 160 seconds, or about 40 seconds to about 150 seconds, at a temperature of about 60° C. to about 100° C. Alternatively, the adhesives can have a gelling time of about 30 seconds to about 300 seconds, about 30 seconds to about 180 seconds, about 30 seconds to about 160 seconds, or about 40 seconds to about 150 seconds, at a temperature of about 80° C.

The adhesives can further comprises water. The adhesives can also comprise an acid. The acid can be an organic acid. The organic acid can be chosen from formic acid, acetic acid, propionic acid, glycolic acid, and mixtures thereof. The adhesive can have a molecular ratio acid:chitosan of about 1:1 to about 1:4

For example, the wood can be chosen from wood particles, unrefined wood fibers, refined wood fibers, wood chips, wood saw dust, wood chips, wood flakes, wood flour, wood shavings, ground wood particles, cut wood particles, wood particles obtained from a dry process, and mixtures thereof.

The panel can have an IB of at least about 0.6, 0.7, 0.8, 0.9 1.0. 1.1, 1.2, 1.3 or 1.4 N/mm². The panel can also have an IB of about 0.5 to about 1.9 N/mm², 0.6 to about 1.8 N/mm², or about 0.8 to about 1.2 N/mm². The panel can have a density of about 480 to about 1200 kg/m³ or about 600 to about 1000 kg/m³.

In the method previously mentioned, the mat can be, for example, pressed by means of a press having a plate temperature of about 100° C. to about 280° C., about 110° C. to about 225° C., about 125° C. to about 200° C., or about 125° C. to about 150° C. The mat can be, for example, pressed during a pressing time of about 20 seconds to about 360 seconds, about 25 seconds to about 225 seconds, or about 30 seconds to about 180 seconds. The mixture used to prepare the mat can comprise or not a crosslinking agent. The crosslinking agent can be, fro example, chosen from those previously mentioned in the present document. The mat can have a humidity level, before pressing, of about 5% to about 45%, about 10% to about 40%, about 15% to about 35%, about 25% to about 35%, or about 30%.

The following examples are presented in a non-limitative manner.

EXAMPLES

Example 1

Force of Adhesion to Wood Sticks

FIG. 1 presents the force of adhesion of the glued sticks compared to a control product with urea-formaldehyde resin.

The first three columns of the column chart shown in FIG. 1 refer to the force of adhesion of three control products comprising a 20, 24, and 61% (weight/volume) aqueous urea-formaldehyde composition.

The resins tested in the fourth to the seventh columns comprise the following elements:
chitosan that has been subjected to acid hydrolysis for 12 hours (20%; and
  optionally one of the following crosslinking agents:
  phenyl glyoxal (PG)
  benzoquinone (BQ)
  tert-butylbenzoquinone (TBQ)
  in a crosslinking agent:chitosan molecular ratio of about 1:15 to about 1:30.

In brief, the resin of the forth column comprises only chitosan, the resin of the fifth column comprises chitosan and TBQ, the resin of the sixth column comprises chitosan and BQ, and the resin of the seventh column comprises chitosan and PG.

Concerning the resins of the fifth to the seventh columns, the constituents were placed in an aqueous solution with acetic acid to obtain a chitosan concentration of about 20% (weight/volume).

The wood sticks, of length of about 11.5 cm, width about 1 cm, and thickness of about 2 mm, were then coated with the test resin over a length of 1 cm. Subsequently, the sticks that had been glued against each other, end to end, were placed under a press at a temperature of about 125° C. (other tests were carried out at temperatures up to about 195° C.).

When the same letter is used for two different columns in FIG. 1, it refers to the fact that there is no significant differences between these two columns (p<0.05).

The minimum gel time at 80° C. for the third, fifth, sixth, and seventh columns were respectively 2.3, 2.4, 0.7, and 9.5 minutes.

Example 2

Manufacture of Panels and Control of Internal Force

Figure 2:
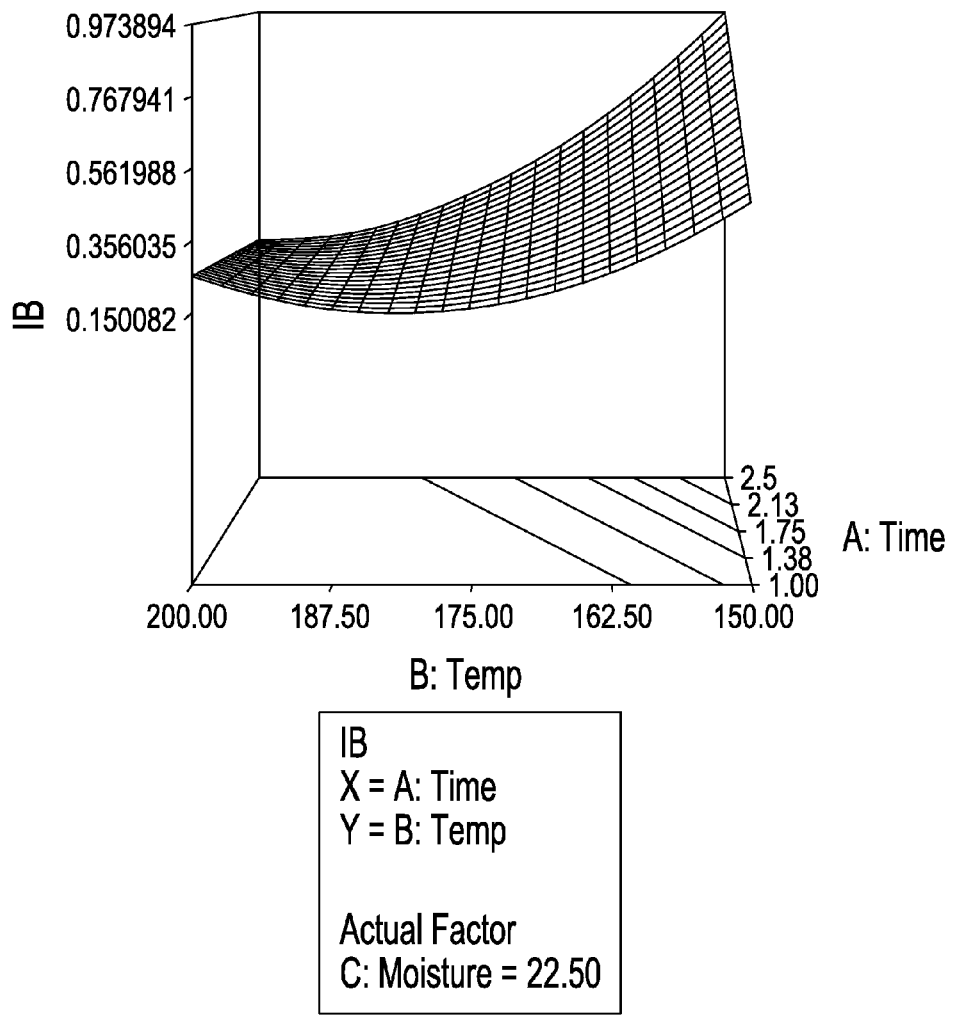
FIG. 2 is a graph showing the effect of the temperature and of the pressing time on the internal cohesion or internal bond (IB) of an example of a panel as discussed in the present document.

To decrease the contribution of water by the resin during the manufacture of the panels, it is possible to use chitosan in solid form and to mix it with the wood (for example wood fiber) at the time of the manufacture of the panel. For this purpose, the fiber has to be more humid. An acid such as an organic acid (for example acetic acid) can be added to the solid mixture to solubilize the chitosan. The conditions were as follows:

chitosan that has been hydrolyzed for about 8 hours and atomized
acetic acid:chitosan molecular ratio of about 1:2
panel thickness: about 6 mm
target density: about 800 kg/m$^3$
initial humidity before pressing: about 15, 22.5, 30 and 35%
adhesive content: about 10%
temperature of the press: about 150° C.
no crosslinking agent
pressing time: about 30, 60, 105 and 180 seconds A control panel based on urea-formaldehyde was produced under the following conditions:

panel thickness: about 6 mm
target density: about 800 kg/m$^3$
initial humidity before pressing: about 10%
adhesive content: about 12%
urea-formaldehyde adhesive used: about 60% to about 65% solid matter content
temperature of the press: about 200° C.
pressing time: about 90 seconds The size of the panels obtained was standardized to about 5 cm×5 cm. Measurements of IB were taken. The results are as follows:

The control panel is characterized by an IB of 1.028±0.220 N/mm$^2$ with a mean density of 784±41 kg/m$^3$. A typical density profile curve is represented in FIG. 2.

With respect to the chitosan-based panels, they present IB results that depend on the pressing temperature and on the humidity of the fiber. Since chitosan is glucose-based, this structure can undergo thermal deterioration, and, as a result, a decrease in internal cohesion is observed. Very interesting results were obtained with a fiber containing about 30% humidity, and pressed at about 150° C. for about 150 seconds. The IB for this panel was about 1.839 N/mm$^2$ while the density was about 1054 kg/m$^3$.

It was observed that in the adhesives previously mentioned, the crosslinking agent can have a reaction time on the order of one minute at temperatures above 80° C. It was also observed that it presents low volatility, and can be soluble in water. Thus, the crosslinking agents used from the glyoxal family, PG, and the two crosslinking agents of the quinone family, namely BQ and TBQ, were found to be quite effective.

Using these agents, the previously mentioned tests of gluing wooden sticks were carried out to measure the force at rupture of the adhesives or of the wood in some cases. Several measurements (n=9) were carried out to decrease the standard deviation, for the purpose of observing any significant differences. The statistical analyses of the results were performed using the software Systat 11. The chitosan used for the comparative tests was a chitosan that had been subjected to about 12 hours of hydrolysis. The hydrolyzed chitosan was solubilized in the presence of acetic acid to obtain a final concentration of about 20% (weight/volume). During these tests, three factors were evaluated: the effect of the molecular ratio crosslinking agent:chitosan, the effect of the temperature, and the effect of the gluing time. For example, a molecular ratio crosslinking agent:chitosan of about 1:15 to about 1:30 was found to provide with an appropriate adhesion. In addition, it was observed that a lower gluing temperature of the pressing plates promotes the force of adhesion. Indeed, the force of adhesion of the glue was significantly higher with a plate temperature of about 125° C. compared to about 165 to about 195° C. (see FIG. 2). At temperatures of about 195° C. and pressing times longer than 2 minutes, a decrease in the force of adhesion was observed. Without being bound to such a theory, such a phenomenon can be due to the degradation of the chitosan.

FIG. 1 shows the effect of the crosslinking agents on the force of adhesion of the gluing of the sticks. One notes the positive effect of the addition of crosslinking agent, more particularly with BQ and PG. Moreover, it can be seen that even when using chitosan alone (i.e. without a crosslinking agent) the obtained results are still superior to the 20 and 24% urea-formaldehyde resins.

After the tests of adhesion to the wooden sticks, fiber gluing tests were initiated, so as to verify the full potential of the above-mentioned adhesives. To facilitate use of chitosan at concentrations greater than about 2% based on dry matter content in the panels without adding too much water via the chitosan solution (for example a concentration of soluble chitosan can be up to 20% with an effective hydrolysis degree of the gluing), the addition of dry chitosan in the form of a powder was considered. The hydrolyzed chitosan can be obtained in forms having different molecular weights and particulate shapes (fine powder, granular powder, and flaky powder). Thus, solubilizing rate tests were carried out at room temperature to compare the solubilization times as a function of particulate size, of the shape, and of certain chemical parameters, such as, the type of acid used for the solubilization and its concentration with respect to the chitosan concentration. Following the solubilization tests, it was observed that atomized chitosan powder (small sphere on the order of about one micron) can allow for a rapid solubilization. In addition, an organic acid such as a C1-C4 organic acid (for example acetic acid) was found to be effective for the obtention of a rapid solubilization. The concentration of the acid influences the solubilization time. Indeed, it was observed that a solubilization rate that was nearly twice more rapid with a molecular ratio acid:chitosan of 1:2 versus a molecular ratio acid:chitosan of 1:4.

The manufacture of panels having a target density of 800 kg/m$^3$ was carried out from unglued wood. An experimental design has been carried out so as to allow the definition of the physical parameters of the pressing (temperature, pressing duration, and percentage of humidity of the fiber before pressing).

Concerning the physical parameters, a first test series was carried out taking into consideration a model defined by the software Design Expert. Thus, the pressing temperatures were about 150, 175, 200 and 217° C., the various pressing times were about 30, 60, 105 and 180 seconds with a varying humidity in the fiber of about 15, 22.5, 30 and 35%. The profile of Design Expert can be seen in FIG. 2.

The determination of the physical pressing parameters of the panels manufactured with powdered chitosan was carried out keeping the quantity of chitosan constant at about 10% based on dry matter content, without crosslinking agent and with a molecular ratio of acetic acid to added chitosan of about 1:2. Taking into account the experimental design of Design Expert, twenty different conditions were implemented in triplicates to obtain a duplicate for the measurements of density and of IB, and in single tests to measure the temperature profile inside the panel.

In general, the IB is influenced by the temperature and the humidity of the panel. A press temperature of more than 150° C. does not allow the obtention of an IB of more than 0.500 N/mm$^2$. The panels produced at 150° C., as the pressing temperature, had IB values of more than 0.600 N/mm$^2$ with a maximum of 1.839 N/mm$^2$ for a fiber containing 30% humidity with a pressing time of 150 seconds. The density of these panels obtained was 1054 kg/m² with the same quantity of fibers based on dry matter content and the same distance of the retention bars (6 mm) of the press.

The density profiles of the panels produced at 150° C., 30% humidity with a pressing time of 150 seconds are represented in FIG. 2. FIG. 2 represents the effect of the temperature and of the pressing time on the IB at a relative humidity of 22.50%. One notes that, at a low pressing temperature (150° C.), the pressing time becomes a factor that has a marked influence on the IB.

Figure 3:
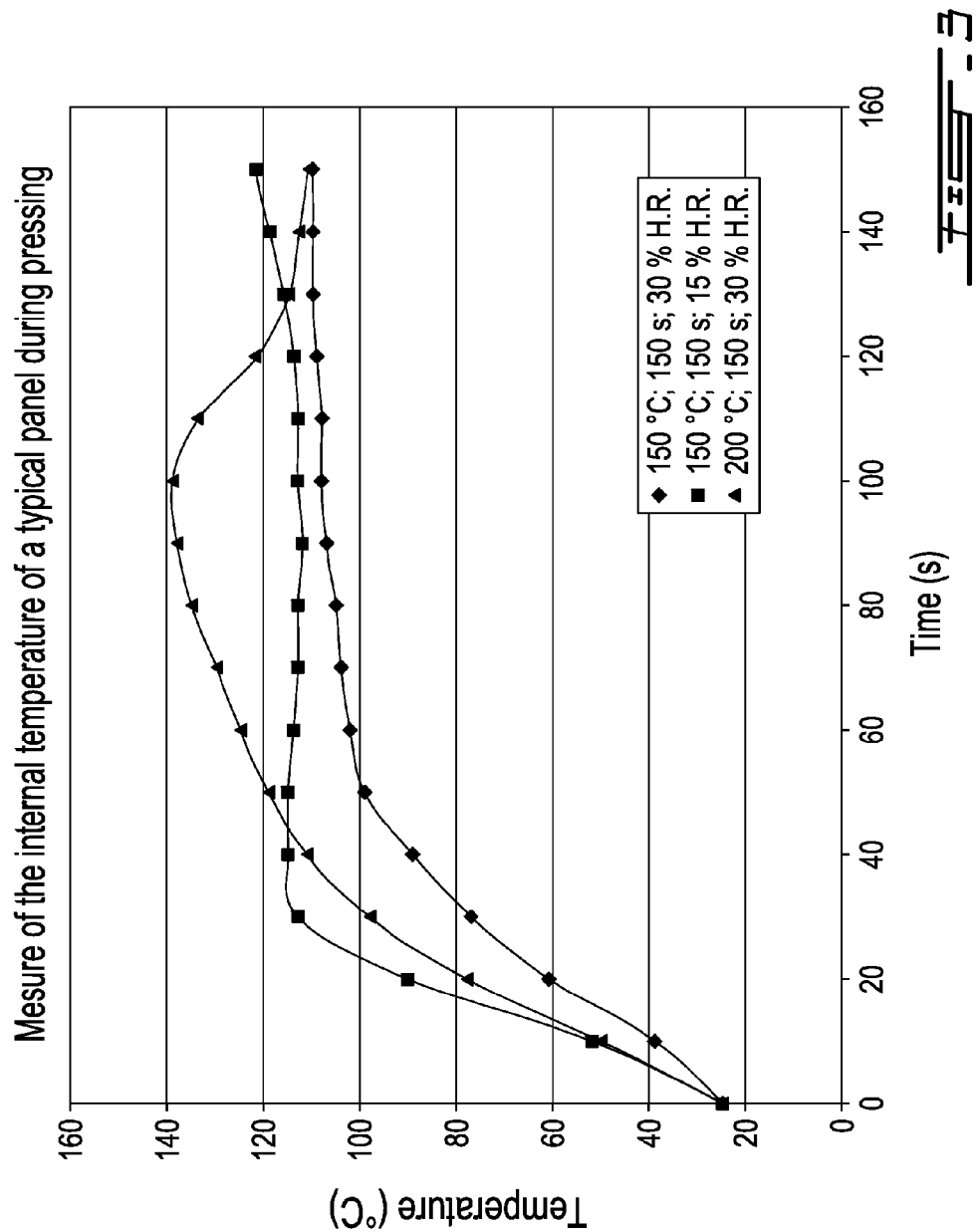
FIG. 3 is a graph showing the internal temperature of an example of a panel as defined in the present document, as a function of time, during pressing.

The internal temperature of the panel is influenced by the temperature of the press and of the relative humidity of the fiber. FIG. 3 represents three tests of measurement of the internal temperature of the panel whose pressing time was fixed at 150 seconds with a pressing temperature of 150 to 200° C. and a relative humidity of 15 to 30%. It can be seen that, at a humidity of 15%, the increase in the temperature of the panel is more rapid than at a relative humidity of 30%, and it reaches temperatures in the core of the panel of 114 to 122° C. at the end of the pressing cycle. At 30% humidity, when the temperature of the press is 150° C., the temperature at the core of the panel does not exceed 110° C. In addition, when the press is adjusted to 200° C., the core of the panel reaches a temperature of 140° C., and it decreases at the end of the cycle to approximately 110° C. Thus, the humidity of the fiber and the pressing temperature influence the internal temperature profile of the panel. It is known from the literature that chitosan has a nitrogenous sugar base, and, like all sugars, it undergoes chemical dehydration, called caramelization, at temperatures exceeding 100° C. This caramelization seems detrimental to the obtention of a strong IB.

According to the results obtained during tests conducted on panels, excellent results have been obtained in terms of internal bond (IB): 1.839 N/mm². Such a result thus show that even the IB requirements or standard of the highest grades of MDF (for examples grades 150, 160, 230 and 240 according to AINSI A208.2-2002 and grades 155 and 230 to according to AINSI A208.2-2009) have been met when using the adhesives described in the present disclosure.

The person skilled in the art will understand that the adhesives previously mentioned can be used in various applications including those previously presented as well as various others in which an adhesive is required. Such adhesives are effective for gluing various materials including wood-based materials.

The present disclosure has been described with regard to specific examples. The description was intended to help the understanding of the disclosure, rather than to limit its scope. It will be apparent to one skilled in the art that various modifications may be made to the disclosure without departing from the scope of the disclosure as described herein, and such modifications are intended to be covered by the present document.

The invention claimed is:

1. A method for manufacturing a wood-based panel, said method comprising preparing a mixture comprising wood, chitosan, an acid, and a crosslinking agent, forming a mat with said mixture, and pressing said mat under heat and pressure so as to obtain said wood-based panel, wherein said acid is present in said mixture at a molecular ratio acid:chitosan of about 1:1 to about 1:4.

2. The method of claim 1, wherein said chitosan is hydrolyzed chitosan.

3. The method of claim 1, wherein said acid is chosen from formic acid, acetic acid, propionic acid, glycolic acid, and mixtures thereof.

4. The method of claim 1, wherein said acid is acetic acid.

5. The method of claim 1, wherein said crosslinking agent is chosen from glyoxal, glyoxal derivatives, benzoquinone, benzoquinone derivatives, and mixtures thereof.

6. The method of claim 1, wherein said crosslinking agent is chosen from methylglyoxal, phenylglyoxal, hexylglyoxal, benzoquinone, t-butylbenzoquinone, and mixtures thereof.

7. The method of claim 1, wherein said crosslinking agent is chosen from phenylglyoxal, hexylglyoxal, benzoquinone, t-butylbenzoquinone, and mixtures thereof.

8. The method of claim 1, wherein said crosslinking agent is phenylglyoxal.

9. The method of claim 1, wherein said crosslinking agent is benzoquinone.

10. The method of claim 1, wherein said crosslinking agent is t-butylbenzoquinone.

11. The method of claim 1, wherein said crosslinking agent is present in said mixture at a molecular ratio crosslinking agent:chitosan of about 1:40 to about 1:10.

12. The method of claim 11, wherein said mat is pressed by means of a press having a plate temperature of about 125° C. to about 150° C.

13. The method of claim 1, wherein said wood-based panel is an oriented strandboard, a low density fibreboard, a medium density fiberboard, a high density fiberboards, a particle board, a hardboards, or plywood.

14. The method of claim 1, wherein said wood-based panel is a medium density fiberboard.

15. A method for manufacturing a wood-based panel, said method comprising preparing a mixture comprising wood, chitosan, an acid, and a crosslinking agent, forming a mat with said mixture, and pressing said mat under heat and pressure so as to obtain said wood-based panel, wherein said crosslinking agent is present in said mixture at a molecular ratio crosslinking agent:chitosan of about 1:40 to about 1:10.

16. The method of claim 15, wherein said crosslinking agent is chosen from glyoxal, glyoxal derivatives, benzoquinone, benzoquinone derivatives, and mixtures thereof.

17. The method of claim 16, wherein said acid is present in said mixture at a molecular ratio acid:chitosan of about 1:1 to about 1:4.

18. The method of claim 15, wherein said crosslinking agent is chosen from methylglyoxal, phenylglyoxal, hexylglyoxal, benzoquinone, t-butylbenzoquinone, and mixtures thereof.

19. The method of claim 15, wherein said acid is chosen from formic acid, acetic acid, propionic acid, glycolic acid, and mixtures thereof.

20. The method of claim 15, wherein said mat is pressed by means of a press having a plate temperature of about 125° C. to about 150° C.

* * * * *